United States Patent
Harris et al.

(10) Patent No.: US 8,458,514 B2
(45) Date of Patent: Jun. 4, 2013

(54) MEMORY MANAGEMENT TO ACCOMMODATE NON-MASKABLE FAILURES

(75) Inventors: Timothy Harris, Cambridge (GB); Karin Strauss, Seattle, WA (US); Orion Hodson, Cambridge (GB); Dushyanth Narayanan, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 361 days.

(21) Appl. No.: 12/965,631

(22) Filed: Dec. 10, 2010

(65) Prior Publication Data

US 2012/0151252 A1 Jun. 14, 2012

(51) Int. Cl.
*G06F 11/00* (2006.01)

(52) U.S. Cl.
USPC ......... 714/6.13; 714/6.11; 714/710; 714/718; 714/723

(58) Field of Classification Search
USPC ................ 714/6.1, 6.11, 6.13, 710, 718, 723
See application file for complete search history.

(56) References Cited

U.S. PATENT DOCUMENTS

| | | | |
|---|---|---|---|
| 6,041,422 A | 3/2000 | Deas | |
| 6,263,452 B1 | 7/2001 | Jewett et al. | |
| 6,363,467 B1 | 3/2002 | Weeks | |
| 7,519,852 B2 * | 4/2009 | Carver et al. | 714/6.1 |
| 7,543,177 B2 | 6/2009 | Bullen et al. | |
| 8,145,960 B2 * | 3/2012 | Mudge et al. | 714/723 |
| 2008/0077824 A1 * | 3/2008 | Mudge et al. | 714/42 |
| 2010/0037102 A1 | 2/2010 | Chen et al. | |
| 2010/0169602 A1 | 7/2010 | Hulbert et al. | |
| 2012/0297271 A1 * | 11/2012 | Sommer et al. | 714/766 |

OTHER PUBLICATIONS

U.S. Appl. No. 12/621,419, filed Nov. 18, 2009, Engin Ipek, Douglas Burger, Jeremy Condit, Thomas Moscibroda, Edmund Nightingale, "Dynamically Replicated Memory".
U.S. Appl. No. 12/780,931, filed May 17, 2010.
U.S. Appl. No. 12/788,329, filed May 27, 2010.
U.S. Appl. No. 12/915,025, filed Oct. 29, 2010.
U.S. Appl. No. 12/943,953, filed Nov. 11, 2010.
Dhiman, et al., "PDRAM: A Hybrid PRAM and DRAM Main Memory System", retrieved on Sep. 24, 2010 at <<http://seelab.ucsd.edu/papers/gdhiman_dac09.pdf>>, ACM, Proceedings of Design Automation Conference (DAC), San Francisco, California, Jul. 2009, pp. 664-469.

(Continued)

*Primary Examiner* — Joshua P Lottich
(74) *Attorney, Agent, or Firm* — Zete Law, P.L.L.C.; MacLane C. Key

(57) ABSTRACT

Methods of memory management are described which can accommodate non-maskable failures in pages of physical memory. In an embodiment, when an impending non-maskable failure in a page of memory is identified, a pristine page of physical memory is used to replace the page containing the impending failure and memory mappings are updated to remap virtual pages from the failed page to the pristine page. When a new page of virtual memory is then allocated by a process, the failed page may be reused if the process identifies that it can accommodate failures and the process is provided with location information for impending failures. In another embodiment, a process may expose information on failure-tolerant regions of virtual address space such that a physical page of memory containing failures only in failure-tolerant regions may be used to store the data instead of using a pristine page.

20 Claims, 10 Drawing Sheets

OTHER PUBLICATIONS

"Did Intel Bite Off More Than It Can Chew?", retrieved on Feb. 23, 2011 at <<http://groups.google.com/group/comp.arch/browse_thread/thread/501ec19d1d81daee/6cfb930ed811e060?lnk=gst&q=page+remapping+ECC+error#6cfb930ed811e060>>, Google comp.arch group, 2011, pp. 1-5.

Ferreira, et al., "Using PCM in Next-generation Embedded Space Applications", retrieved on Sep. 24, 2010 at <<http://www2.ee.kth.se/conferences/cpsweek2010/PDF/RTAS/Using%20PCM%20in%20Next-generation%20Embedded%20Space%20Applications.pdf>>, IEEE Real-Time and Embedded Technology and Applications Symposium, Stockholm, Sweden, Apr. 2010, pp. 153-162.

Ipek, et al., "Dynamically Replicated Memory: Building Reliable Systems from Nanoscale Resistive Memories", retrieved on Sep. 24, 2010 at <<http://research.microsoft.com/en-us/um/people/moscitho/Publications/ASPLOS2010.pdf>>, ACM, Proceedings of Conference on Architectural Support for Programming Languages and Operating Systems (ASPLOS) and SIGARCH Computer Architecture News, vol. 38, No. 1, 2010, pp. 3-14.

Qureshi, et al., "Scalable High Performance Main Memory System Using Phase-Change Memory Technology", retrieved on Sep. 24, 2010 at <<http://www.cs.ucsb.edu/~chong/290N/pcm.pdf>>, ACM, Proceedings of Intl Symposium on Computer Architecture (ISCA, Austin, Texas) and SIGARCH Computer Architecture News, vol. 37, No. 3, Jun. 2009, pp. 24-33.

Schechter, et al., "Use ECP, not ECC, for Hard Failures in Resistive Memories", retrieved on Sep. 24, 2010 at <<http://research.microsoft.com/pubs/131678/isca-ecp-final.pdf>>, ACM, Proceedings of Intl Symposium on Computer Architecture (ICSA), Saint-Malo, France, Jun. 2010, pp. 141-152.

"VAX", retrieved on Feb. 23, 2011 at <<http://en.wikipedia.org/wiki/VAX>>, Wikipedia, 2011, pp. 1-7.

* cited by examiner

MEMORY MANAGEMENT TO ACCOMMODATE NON-MASKABLE FAILURES

BACKGROUND

The main memory of a computer is usually formed from dynamic random access memory (DRAM) which provides memory cells that can be written up to $10^{15}$ times and from a practical perspective can be considered to allow an unlimited number of writes. Other memory technologies are now being investigated as an alternative to DRAM in order to scale to higher densities (thereby enabling smaller devices or more storage in the same physical space) or to provide non-volatile storage (therefore avoiding the need for periodic refresh and allowing the memory to retain its contents without continuing to be powered). A problem with many of these technologies, however, is that compared to DRAM they have a limited write endurance. Phase-change memory (PCM), which is an example of a new form of non-volatile memory (NVM), can endure $10^7$-$10^9$ writes before it permanently fails and other technologies may have a significantly worse write endurance.

Programmers expect the failure-free properties of DRAM, irrespective of the memory technology used and consequently a number of techniques have been developed to mask memory failures from the software executing on the hardware. In an example, error correcting (or correction) codes (ECC) may be used where extra cells store redundant information which can be used to re-compute the original information in case of failure. Other examples include memory channel failover, where writes are issued to two or more channels and when failure occurs on a channel, it ceases to be used, and cell remapping where spare cells are used to replace faulty memory cells.

The embodiments described below are not limited to implementations which solve any or all of the disadvantages of known memory management methods.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods of memory management are described which can accommodate non-maskable failures in pages of physical memory. In an embodiment, when an impending non-maskable failure in a page of memory is identified, a pristine page of physical memory is used to replace the page containing the impending failure and memory mappings are updated to remap virtual pages from the failed page to the pristine page. When a new page of virtual memory is then allocated by a process, the failed page may be reused if the process identifies that it can accommodate failures and the process is provided with location information for impending failures. In another embodiment, a process may expose information on failure-tolerant regions of virtual address space such that a physical page of memory containing failures only in failure-tolerant regions may be used to store the data instead of using a pristine page.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
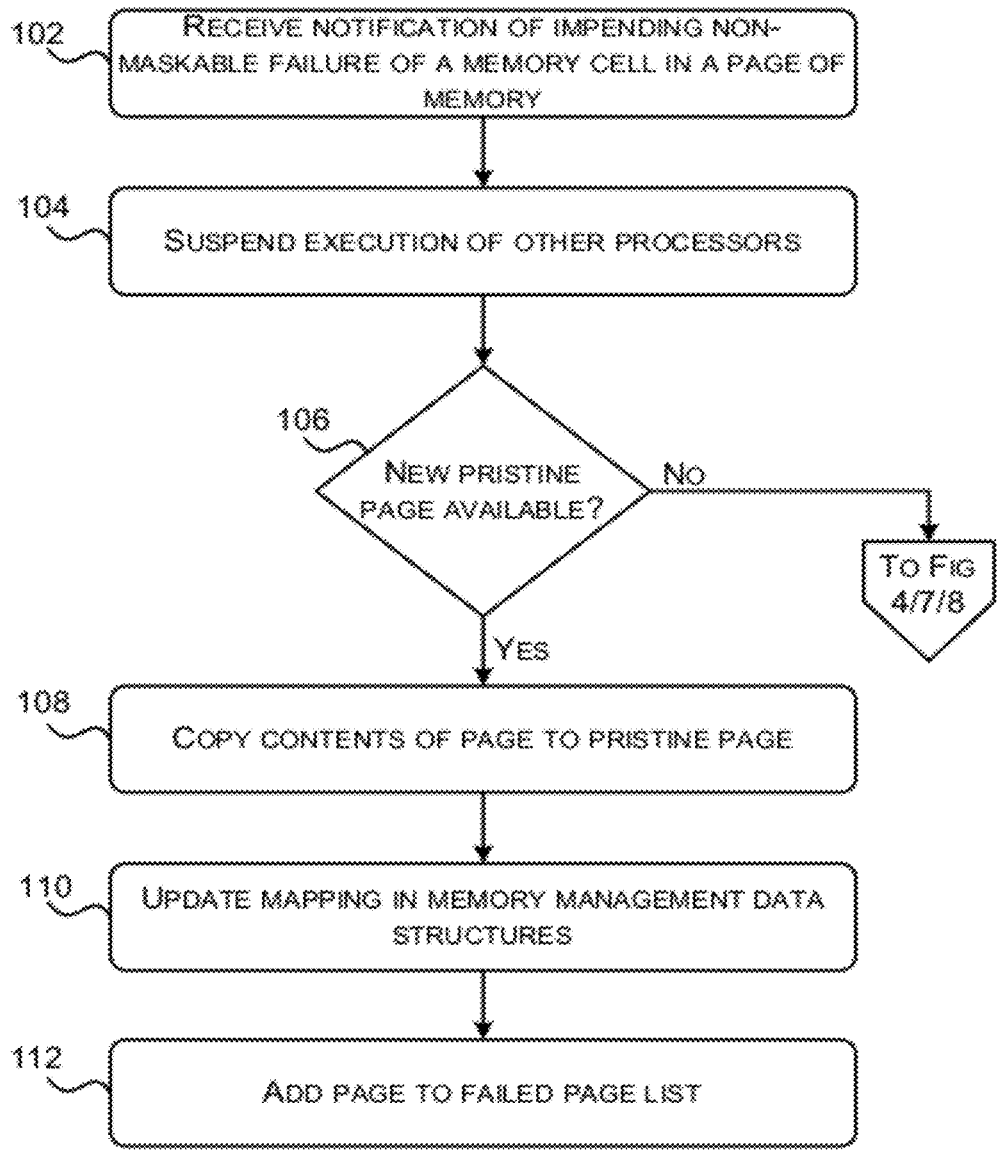
FIG. 1 is a flow diagram of an example method of memory management which allows a page with failures to be replaced by a page without failures.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As described above, the main memory of a computer has traditionally been formed from DRAM which is essentially failure free, but many newer memory technologies, such as PCM, are more prone to failures. Managed languages, such as C# and F#, are able to move objects within a program's virtual address space (e.g. during garbage collection) and can consequently move an object whose storage has failed (or whose failure is impending) to a new location whose storage has not yet failed. Unmanaged languages, however, such as C and C++, are unable to move an object to a new virtual address once it has been allocated at a given virtual address and consequently it is much more difficult for these languages' implementations to operate using memory technologies that are prone to failures.

A number of solutions have been proposed, such as Error Correcting Pointers (ECP), as described in co-pending U.S. patent application Ser. No. 12/788,329, (filed on May 27, 2010), entitled 'Error Correcting Pointers for Non-Volatile Storage' which is incorporated herein by reference in its entirety. ECP allows a failed memory location to be replaced by a still-working memory location and for example, may operate at the level of a row within a memory chip and allow additional storage bits added to the row to be used to replace any failed bits within the same row. In another solution, described in 'Dynamically Replicated Memory: Building Resilient Systems from Unreliable Nanoscale Memories', co-pending U.S. patent application Ser. No. 12/621,419, (filed Nov. 18, 2009), which is incorporated herein by reference in its entirety, a page in a processor's physical address space can be constructed by combining parts of two pages in the underlying memory, where the two pages have failures that are in different locations within the pages. In a further solution described in co-pending U.S. patent application Ser. No. 12/915,025, (filed Oct. 29, 2010), entitled 'Mapping of Inoperable Memory Blocks' which is incorporated herein by reference in its entirety, a memory controller is extended to provide alternative storage for a limited number of physical addresses that have failed and accesses to these physical addresses are redirected by the controller to alternative locations that have not failed.

Many of the existing solutions allow memory failures to be masked by hardware; however, implementations of the solutions are likely to impose practical limits on the number of failures that can be masked (or hidden). With time, failures will accumulate and a point will be reached where the number of failures can no longer be masked by hardware.

The methods described below may be used for any type of non-volatile memory (NVM) with a failure detection mechanism, i.e. where failures or impending failures can be identified. Examples of such NVM include, but are not limited to, PCM (which may also be referred to as PRAM), resistive RAM (RRAM) such memristors, spin-torque transfer magnetoresistive RAM (STT-RAM), magnetic RAM (MRAM), ferroelectric RAM (FRAM), and Racetrack memory.

FIG. 1 is a flow diagram of an example method of memory management which allows a page with failures to be replaced by a page without failures. The method is initiated upon receipt of a notification of an impending non-maskable failure of a memory cell in a page of memory (block 102). The term 'non-maskable failure' is used herein to refer to a failure (which typically occurs in hardware at the granularity of a single bit or a row of bits in a chip) whose presence cannot be hidden from software by existing hardware mechanisms (e.g. ECP, as described above). The term 'page' refers to the granularity at which an operating system manages memory and is typically 4 Kbytes or 2 Mbytes. Some systems support a range of page sizes and in an example where both 4 KB and 2 MB pages are supported, a 2 MB page may be referred to as a 'super page' and a 4 KB page may be referred to as a 'page'. In the following discussion, reference to a page containing failures includes pages comprising an actual failure (i.e. a bit which is not functioning) and/or pages comprising an impending non-maskable failure. Once an impending non-maskable failure notification is received for a memory location, then that location is considered to have failed and is not used any more.

The notification (received in block 102) may, for example, be signaled to the operating system by an interrupt and may be triggered by any of the masking solutions described above or another failure masking technique. The notification of an impending non-maskable failure indicates that the ability of existing hardware mechanisms to mask failures is close to being exceeded and the notification occurs before any data is lost (unlike, for example, an error correction code failure notification). In an example where $ECP_n$ is used and where n is the number of n correction entries which are provide to replace up to n failed memory cells with working cells, this interrupt may be triggered when the number of correction entries in use equals n−2, n−1 or n, for example, in any row. This number of correction entries in use may, for example, be stored in a correction counter (e.g. as described in co-pending U.S. patent application Ser. No. 12/788,329 or may be determined by counting the number of bits set in a bitmap representing which correction entries are in use (e.g. as described in http://research.microsoft.com/pubs/131678/isca-ecp-final.pdf).

In response to the notification (in block 102), the execution on other processors may be suspended (in block 104). This may be performed by the operating system sending an inter-processor interrupt (IPI) to other processors in response to which they pause until the processor handling the impending failure notification has finished. This suspension of other processors prevents other processors from continuing to access the particular page of memory and reduces the likelihood of further failures occurring before the first failure is resolved. In some implementations, this suspension may relate only to processors which have an ability to write to the particular page of memory, although as failures do not occur very often, all processors may be suspended.

The method then attempts to allocate a new pristine page of physical memory (e.g. using standard mechanisms). The term 'pristine page' is used herein to refer to a page that is free from non-maskable failures and impending non-maskable failures (but may contain maskable failures, which are failures whose presence can be hidden from software by existing hardware mechanisms, such as ECP). If a new pristine page is available ('Yes' in block 106), the system software (e.g. the operating system or a virtual machine monitor operating below a traditional operating system kernel) copies the contents of the particular page of memory with the impending non-maskable failure to the pristine page (block 108) and then updates its memory management data structures such that virtual pages which were mapped to the particular page of memory (in the machine's physical address space) now refer to the new page (block 110). This updating of data structures may involve communicating with other processors to instruct them to flush specific translation lookaside buffer (TLB) entries for virtual addresses in the pages which have been remapped, or the entire TLB when selective TLB entry flushing is not available. The page with the impending non-maskable failure is then added to the failed page list (block 112). In some examples a further IPI may be sent to end the suspension of other processors (following the suspension in block 104). In other examples, however, only one IPI is used and barriers using shared variables may be used to coordinate actions or the messaging to lift the suspension of other processors may be included in the messaging relating to TLB flushing.

Figure 2:
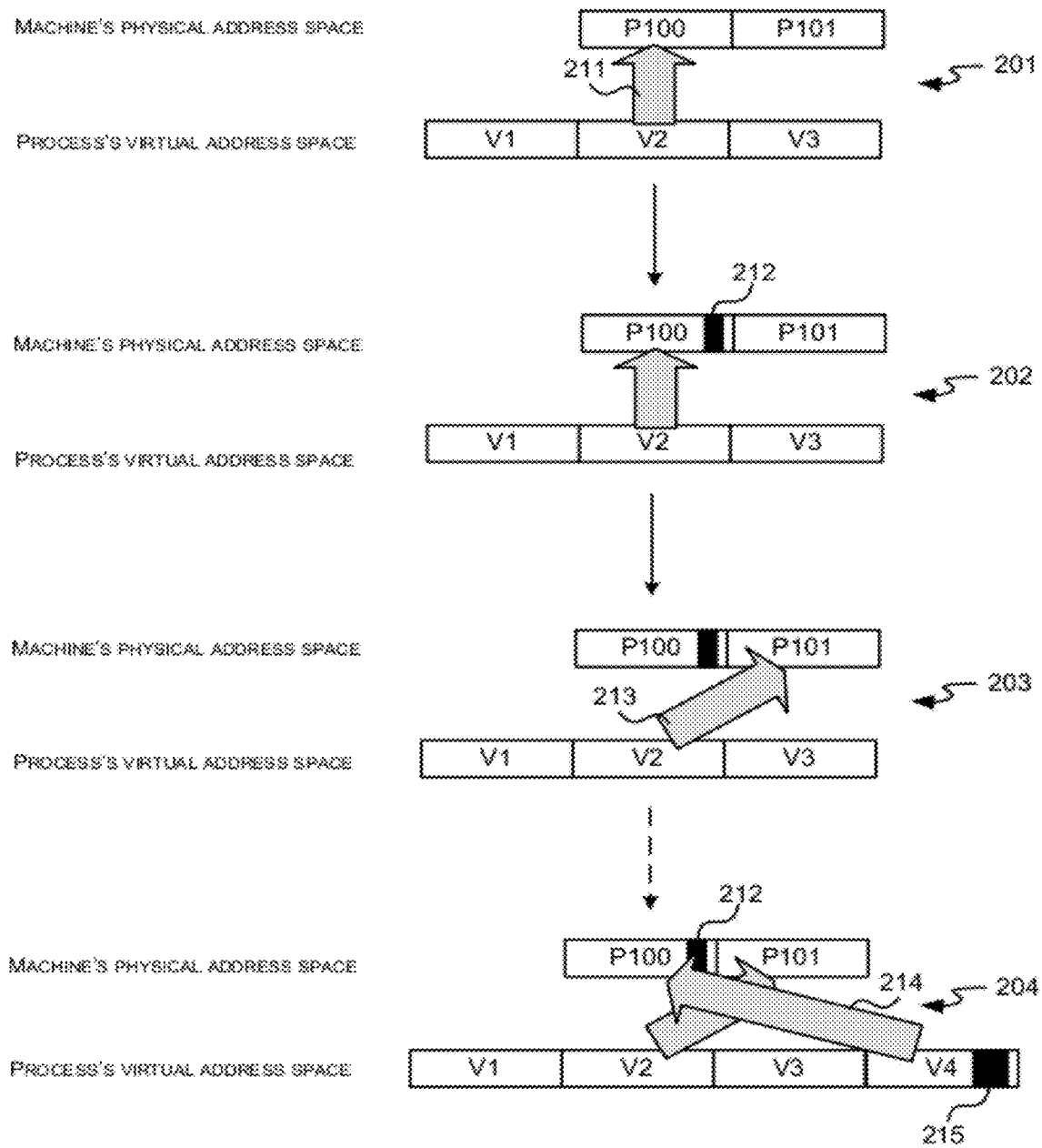
FIG. 2 is a schematic diagram showing remapping of virtual memory to physical memory.

This memory remapping is shown in the schematic diagram of FIG. 2. The first diagram 201 shows the initial situation where a page V2 in a process's virtual address space is mapped to a page P100 in a machine's physical address space (as indicated by arrow 211). In the second diagram 202, the portion 212 of the physical page P100 with an impending non-maskable failure is shown in solid black. The third diagram 203 shows the result of the remapping (e.g. as performed by the method shown in FIG. 1) where a new pristine page of physical memory P101 has been allocated, the contents of P100 copied to P101 (block 108) and the mapping of the virtual address page V2 has been updated (in block 110) to map to P101 instead of P100, as indicated by arrow 213. The fourth diagram in FIG. 2 is described below with reference to FIG. 3.

If no pristine page available to copy the contents of the page with the impending non-maskable failure to ('No' in block 106), there are a number of different strategies which may be used and these are discussed in more detail below with reference to FIGS. 4, 7 and 8.

Figure 3:
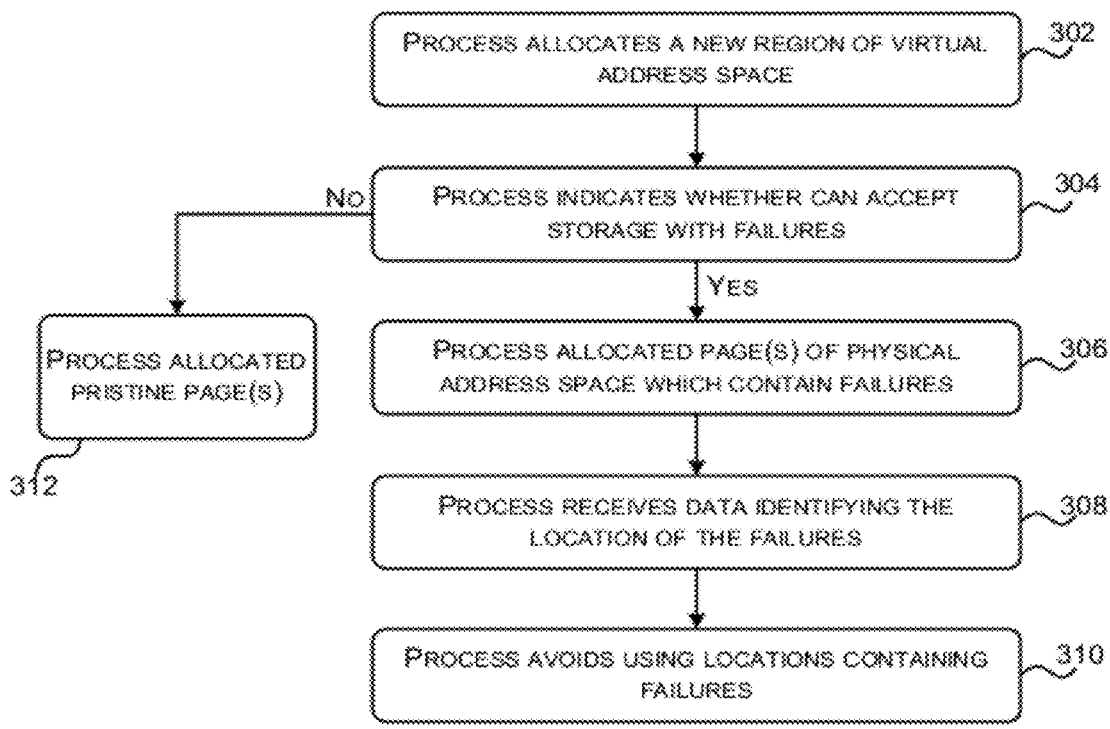
FIGS. 3 and 4 are flow diagrams of further example methods of memory management which enable a system to re-use pages even though they have experienced non-maskable failures.

In the method shown in FIG. 1, the page (P100 in the example of FIG. 2) with the impending non-maskable failure is added to the failed page list (in block 112) and as a result the page is no longer used by the system. FIG. 3 is a flow diagram of another example method of memory management which is an extension to the method shown in FIG. 1 and which enables a system to re-use pages even though they have experienced impending or actual non-maskable failures. This extension is shown in the fourth diagram 204 of FIG. 2. This method reduces wastage of memory because memory pages may be considerably larger (e.g. 4 KB or 2 MB) than the granularity at which failures occur.

When a process allocates a new region (e.g. page) in its virtual address space (block 302 and labeled V4 in FIG. 2), the process indicates whether it is willing to accept physical storage that has experienced impending or actual non-maskable failures (block 304), for example by passing a flag to the operating system when storage is allocated. In an example implementation, this indication (in block 304) may be provided as a parameter to a library call such as VirtualAlloc (for Win32®) or mmap (in UNIX®). If the process indicates that it is able to accept physical storage that has experienced impending or actual non-maskable failures ('Yes' in block 304), the process may be allocated physical storage (e.g. a page of physical storage P 100) which contains one or more impending or actual non-maskable failures (block 306 and as indicated by arrow 214 in FIG. 2).

The physical storage which is allocated in block 306 (e.g. page P100) may be allocated from pages on the failed page list (e.g. to which it was added in block 112 of FIG. 1) or a system may maintain more than one list of pages. In an example, a system may maintain a list of pristine pages, a list of pages with failures which could be used for allocation in block 306 of FIG. 3 and a list of failed pages. The list of failed pages may comprise those pages which have so many failures (or impending failures) that they are considered unstable and this may be defined in terms of a threshold, e.g. where this is a fixed value set by the author of the system software or where this may be specified by a process (e.g. when the process calls VirtualAlloc). In another example, a system may have additional lists, e.g. for each of the lists specified previously there may be lists which distinguish between pages of each kind based on whether or not the page's old contents have been cleared. In another example, different lists may be stored for different levels of failures which provides an indirect measurement of how difficult it is to re-use them.

Where the process is allocated a page which contains impending or actual non-maskable failures (in block 306), the process also receives data which identifies the location of the impending or actual failures 212 within the allocated page P100 (block 308). This data on the location of impending or actual failures within a page (which is received by a process in block 308) may be stored when the impending or actual failures are initially reported (e.g. as part of the notification in block 102 of FIG. 1) or may be provided in another way by an error masking technique such as ECP. In another example, actual failures may be detected by the operating system when zeroing the page (i.e. setting all the bits to zero), or when sequentially setting all the bits to one then zero (or vice versa), before allocating it to a process. The impending or actual failure locations may be recorded, for example, within the page itself (e.g. as a linked list threaded through non-failed regions adjacent to the failures), as a bitmap or using any other technique. Although the failures will typically occur to a single bit or a small number of bits (e.g. a row), the recording of failures may quantize the information to a particular granularity (e.g. 512 bits) to reduce the size of the data identifying failure locations. This data may be provided to the process when the memory is allocated or alternatively, the process may query the operating system (when required) to identify the location of impending or actual failures within the physical region (e.g. page) associated with an allocated region of virtual address space.

Using the failure location data (received in block 308), the process then avoids using locations containing the impending or actual failures (block 310) and in FIG. 2, the region which the process avoids using is shown in solid black 215. As shown in FIG. 2, the region of memory 215 which is not used may be larger than the failed region 212 and this may be due to quantization in the recording of impending or actual failure location (as described above) or for other reasons. In an example, if failures are masked using ECP on a per-row basis, the region 215 which isn't used by the process extends to include at least the complete row in which the impending non-maskable failures occur. The process will then continue to receive notifications of impending non-maskable failures (as in block 102 of FIG. 1) for other rows.

There are a number of ways that the process can avoid using the locations containing impending or actual non-maskable failures and in a first example, if the page (V4) is holding program code then relocation can be used to place the code around the impending or actual failures. If the impending or actual failure occurred due to writes (e.g. when using PCM), it may be particularly effective to re-use the failed pages for immutable data such as program code. In a second example, if the page is to be used for the process's heap, then the location of any impending or actual failures may be treated as allocated objects (e.g. with a free-list based allocator, these locations would not be added to the free-list and with a bitmap-based allocator, the bits for these locations would be set to indicate that the space had already been allocated). In an example, a process may allocate an object over the region 215 containing impending or actual non-maskable failures if the process knows that it will not be using either the region 215 or the more specific impending or actual non-maskable failure locations 212 (where this data is also available to the process).

The initial method shown in FIG. 1 and the extension shown in FIG. 3 allow a system to continue operating in the presence of impending or actual non-maskable failures and also allow failed pages (i.e. the pages containing these impending or actual non-maskable failures e.g. page P100 in FIG. 2) to be reused for new allocations. FIG. 4 is a flow diagram of another example method of memory management which may be an extension to the method shown in FIG. 1 and/or FIG. 3 or may be used independently and which enables a system to re-use pages at other times (e.g. for situations other than new allocations). This method may be performed, for example, upon fault notification (e.g. following blocks 102, 104 in FIG. 1 instead of allocating a pristine page or where a pristine page isn't available following block 106) or at any time, e.g. as part of a 'clean-up' operation to reduce the number of pages that cannot be used (e.g. as they are on the failed pages list).

A process exposes information about which parts of which pages of virtual memory are failure-tolerant and/or failure-sensitive and this information is obtained (in block 402) by the system implementing the method, which may for example be the operating system or the language runtime system. Areas of pages which contain useful data may be considered failure-sensitive (e.g. in the process's heap, areas which contain allocated objects are considered failure-sensitive) and other locations (e.g. free space) may be considered failure-tolerant and it will be appreciated that a process may expose either or both the failure-sensitive and failure-tolerant regions. Other examples of failure-tolerant regions may be those below the extent of a thread's stack or padded space between functions in code. In an example, the shaded region 215 of V4 in FIG. 2 may be considered failure-tolerant. It will be appreciated that as objects are allocated or de-allocated, the failure-sensitive/failure-tolerant regions of memory will change and therefore this information which is exposed by a process is not static.

Figure 5:
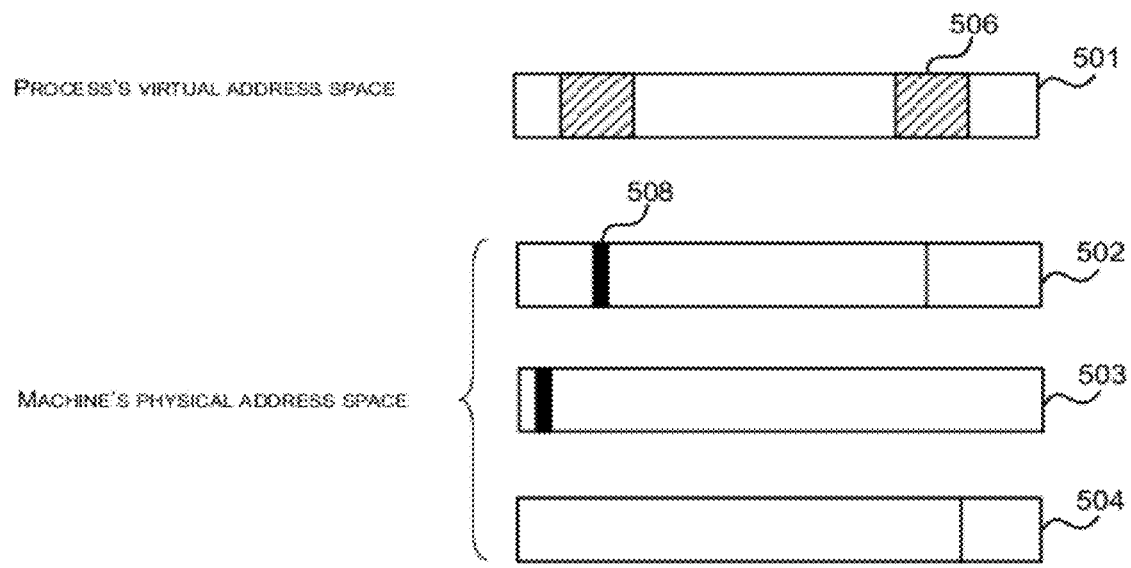
FIGS. 5 and 6 are schematic diagrams showing matching of virtual memory pages and physical memory pages.

Information is also obtained about the locations of actual or impending non-maskable failures in physical pages (block 404), e.g. shaded region 212 of P100 in FIG. 2. This information may be obtained, as described above with reference to FIG. 3 (and in particular block 308) as part of periodic operations such as page-zeroing or it may be provided by the hardware. A matching algorithm can then be used to identify compatible non-pristine physical pages for virtual pages (block 406) and this is represented graphically in FIG. 5. FIG. 5 shows 'page maps' for one virtual page 501 and three pages of physical memory 502-504 with failure-tolerant regions in the virtual page being shaded (e.g. shaded region 506) and regions with actual or impending non-maskable failures in the physical pages being solid black (e.g. region 508). It can be clearly seen by comparison of these maps in this simple example that physical pages 502 and 504 are compatible with the virtual page 501 as the only 'failed' regions align with failure-tolerant regions, whilst physical page 503 is not compatible because it contains an actual or impending non-maskable failure in a position which is not failure-tolerant.

The matching process (in block 406) may, for example, be implemented as an instance of a maximal matching algorithm or via heuristics. An example of a method which may be used is described in co-pending U.S. patent application Ser. No. 12/621,419 (e.g. as described with reference to FIG. 8 of that application). This method uses a dynamic pairing algorithm which may be stored in a memory module and executed on a processor. The algorithm takes a page of physical memory (e.g. page 501 in FIG. 5) and compares it to each non-pristine un-used page of physical memory (where such pages may be stored on a free list or on a separate list). Where a match is identified (e.g. between page 501 and page 502 or 504), this matching may be stored on another list (e.g. a ready list) and then subsequently used for memory re-allocation (in blocks 408, 410). The method may be repeated for other pages to identify matches so that the most effective set of matches can be selected before performing the memory re-allocation (e.g. with the aim to generate a free list comprises pages with as few errors as possible).

Where a replacement page is identified through the matching process (in block 406), data can then be copied from the original physical page to the identified non-pristine page (block 408) and the memory mappings updated (block 410) e.g. as described above with reference to block 110 of FIG. 1. If this method is performed when failure notification occurs (e.g. upon notification of an impending non-maskable failure, as in block 102 of FIG. 1), the matching process (block 406) may determine whether the existing physical page is still compatible with the virtual page. For example, if at the time of failure notification, the failure-tolerant regions are as shown by page 501 in FIG. 5 and the failure notification identifies a failure at a position as shown by page 504 in FIG. 5, then the existing physical page is still compatible with the virtual page, despite the failure notification and in this case it is not necessary to perform any remapping (blocks 408 and 410 are omitted). If, however, the physical page to which page 501 was previously mapped was pristine and the failure notification identifies a failure at a position as shown by page 503 in FIG. 5, the matching process (in block 406) may determine that page 503 is not compatible but either of pages 502 and 504 are compatible and in this case data may be copied to either page 502 or 504 (in block 408) and memory mappings updated (in block 410). In this example, where there are a set of pages which are identified by the matching process as being compatible with the virtual page, it may be optimum to select the compatible page which has the most actual or impending non-maskable failures so as to maintain a set of pages which are available for use which are as close to pristine as possible (i.e. to optimize the free list).

Figure 4:
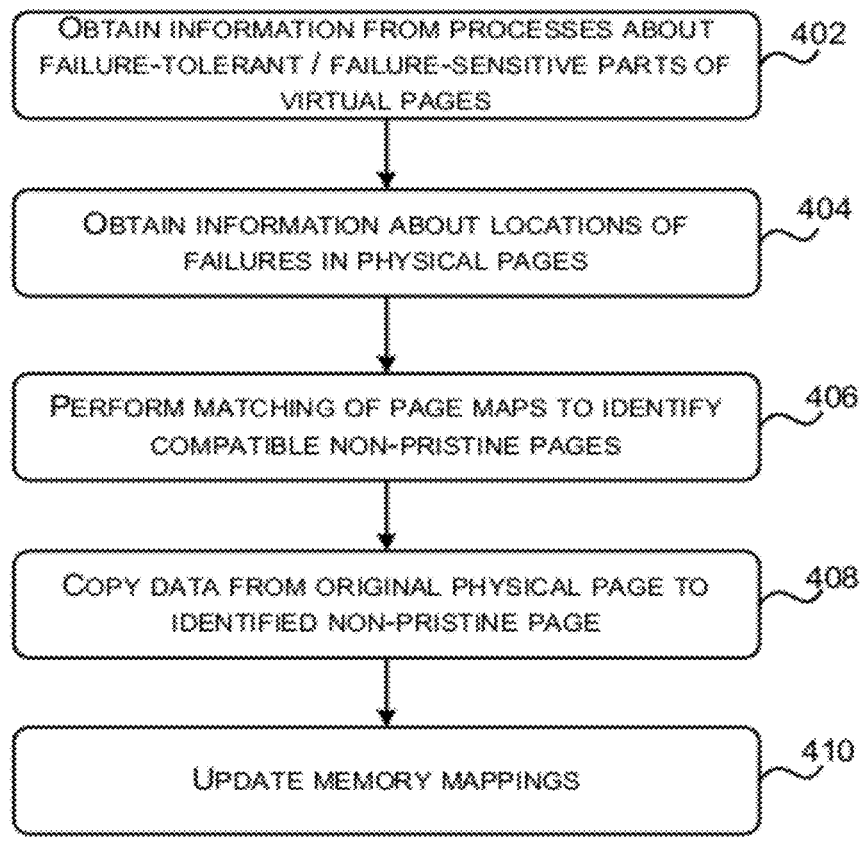

If the method shown in FIG. 4 is performed periodically, for example if the system is low on free pages which are pristine or contain only a few actual or impending non-maskable failures or as part of a clean-up process (e.g. to optimize the set of free pages), the matching process (in block 406) may determine whether there is an existing un-used page in physical memory which contains more actual or impending non-maskable failures than the current physical page mapped to a particular page of virtual memory but which still only contains actual or impending non-maskable failures in failure-tolerant regions. For example, if virtual page 501 in FIG. 5 is mapped to a pristine page or physical page 504, the matching process may identify physical page 502 as being compatible and containing more actual or impending non-maskable failures and therefore data may be copied from the pristine page or page 504 to physical page 502 (in block 408) and the relevant memory mappings updated (block 410). Through use of this method, physical pages of memory with few actual or impending non-maskable failures can be freed up (e.g. and added to the free list) which increases the flexibility for subsequent memory allocations.

Figure 6:
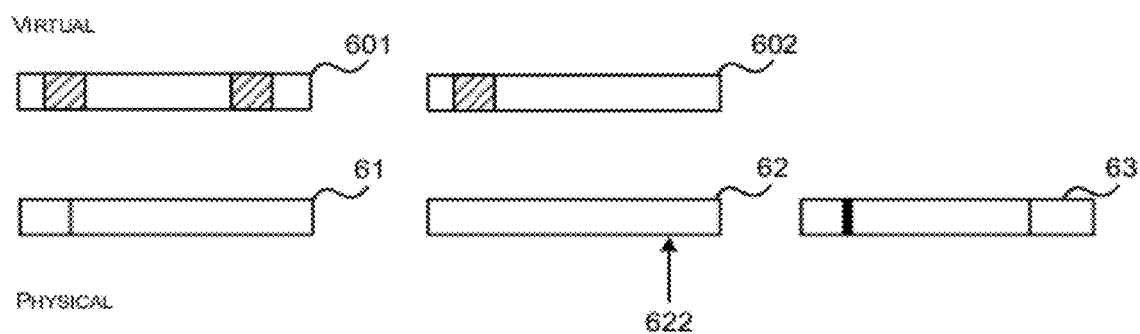

In some examples, the matching process may look at physical pages which are already in use in addition to, or instead of, looking at physical pages which are not in use (e.g. which may be on a free list) and again this may be performed in order to optimize the free list. In such an example as shown graphically in FIG. 6, there are two virtual pages 601, 602 which are mapped to physical pages 61, 62 respectively. Physical page 62 is pristine and physical page 61 has a single actual or impending non-maskable failure (as indicated by the solid line). The free list comprises a single physical page 63 which contains a number of actual or impending non-maskable failures. The matching process (in block 406) may determine (e.g. as part of a clean-up operation) that in order to optimize the free list, virtual page 601 should instead be mapped to physical page 63 and virtual page 602 should instead be mapped to physical page 61, leaving the pristine page 62 on the free list. In this example, the swapping of data between pages may be performed iteratively, by first copying data from page 61 to page 63 and performing a remapping of page 601 and then copying data from page 62 to page 61 and remapping page 602. In other examples, data may be written to DRAM or other dedicated memory as an intermediate stage in the process and this may be particularly useful where the method is being performed in response to a fault notification. For example, given the example of FIG. 6 without page 63 (e.g. such that there are two virtual pages 601 and 602 and two physical pages 61 and 62), if a notification is received of an impending non-maskable failure at a position in page 62 marked by arrow 622 and in the absence of any suitable free page to map virtual page 602 to, the matching process may identify that page 601 should now be mapped to page 62 and page 602 should now be mapped to page 61. In order to perform this remapping, the contents of physical page 62 may be first copied to DRAM or other dedicated memory and the mapping of virtual page 602 remapped. The contents of physical page 61 may then be copied to the newly freed page 62 and virtual page 601 remapped to page 62 before the contents of the DRAM (i.e. the original contents of page 62)

are copied to the newly freed page 61 and the virtual page 603 remapped for a second time from the DRAM to page 61.

The discussion of FIG. 4 above does not show any suspension of execution of other processors as is described in block 104 of FIG. 1; however the process whose mappings are being considered may be suspended between blocks 402 and 410 of FIG. 4 so that the location of failure-tolerant/failure-sensitive regions does not change. In an example implementation, these method blocks may be performed on a single process at a time, with processors able to continue work but just not to run the particular process. In another example implementation, the method blocks may be performed across all of the processes in the machine at once, and this may be performed at a time when they are already suspended (e.g. after block 104 in FIG. 1).

As described above, the method of FIG. 4 may be performed by the system software or the language runtime system. If the method is implemented by the language runtime system, the operating system provides an interface exposing the location of failures in the process's address space. If the method is implemented by the operating system, the language runtime system provides an interface exposing the location of failure-tolerant regions and receiving notification of page remapping that is performed. The language runtime system may use randomization techniques to reduce the likelihood that different pages have failure-tolerant regions that coincide, e.g. the runtime system may start allocations at different offsets within different pages or it may place thread stacks at different offsets.

Although the discussion of the method of FIG. 4 and the schematic diagram of FIG. 5 refers to failure-tolerant regions, it will be appreciated that the method may alternatively be described in terms of failure-sensitive regions, where the matching process ensures that no actual or impending non-maskable failures occur within regions identified as failure-sensitive. It will also be appreciated that data identifying failure-tolerant regions may comprise data which identifies either or both failure-tolerant and failure-sensitive regions.

As described above, the method of FIG. 4 may be used in situations where an impending non-maskable failure has been notified but there are no pristine pages available ('No' in block 106 of FIG. 1). FIGS. 7 and 8 show two further methods which may be implemented in such a situation and the methods may be used together (e.g. FIG. 8 may follow on from FIG. 7 in some circumstances) or independently. The first of such methods, shown in FIG. 7, may be used if the system supports multiple page sizes ('Yes' in block 702), e.g. the system supports both 4 KB and 2 MB pages, and if the page with the impending non-maskable failure (e.g. P100 in the example of FIG. 2) is not the smallest size page ('Yes' in block 704), e.g. P100 is a 2 MB page. In such an instance, the page with the impending non-maskable failure (e.g. P100) is divided into multiple smaller pages (block 706) and a smaller pristine page is allocated (in block 708) to replace the smaller page which contains the impending non-maskable failure. This is shown graphically in FIG. 9, with the page P100 being divided into multiple smaller pages P100a-d (only four smaller pages are shown by way of example only). A smaller pristine page P102 is then allocated (block 708), the contents of the smaller page containing the impending non-maskable failure P100c are copied to the newly allocated pristine page P102 (block 710) and then the smaller virtual page V2c is remapped to the newly allocated page P102 (block 712). The smaller page with the impending non-maskable failure P100c is then added to the failed page list (block 714).

Figure 7:
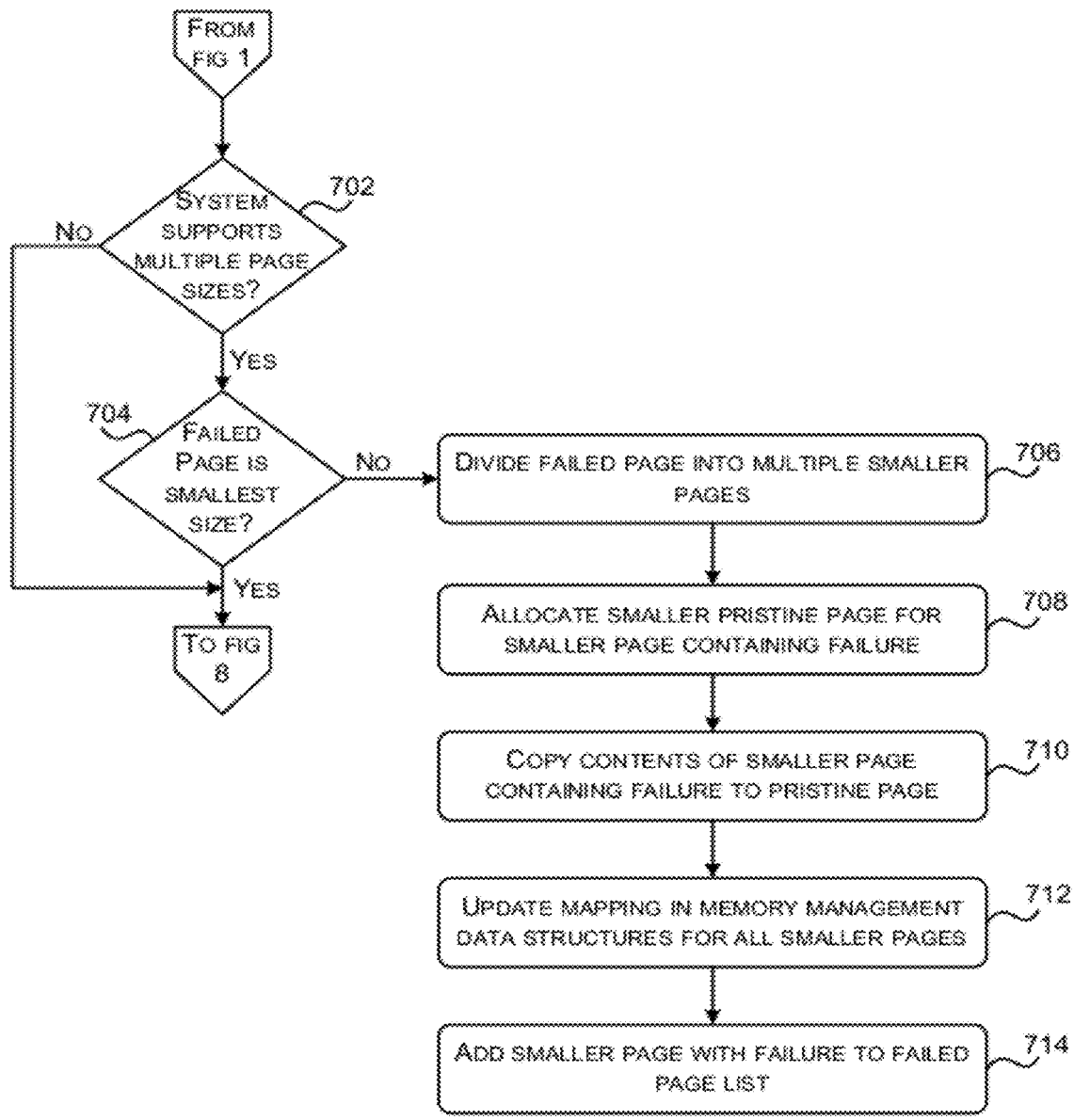
FIGS. 7 and 8 are flow diagrams of further example methods of memory management which may be used in situations where an impending non-maskable failure has been notified but there are no pristine pages available.

Although the method shown in FIG. 7 is described above as being used only when there are no pristine pages available which are the same size as the page containing the impending non-maskable failure, the method may also be used in any situation where the system supports multiple page sizes and the page containing the impending non-maskable failure is not the smallest size (i.e. block 702 may follow on directly from block 104 in FIG. 1 omitting the decision step of block 106). It can be seen that this reduces the amount of memory which is included in the failed pages list and may in some implementations not be used again. In the example of FIGS. 1 and 2, the whole of page P100 is added to the failed list (in block 112) whereas in the example of FIGS. 7 and 9, only a portion of P100, smaller page P100c, is added to the failed list (in block 714).

Additionally, although the discussion of FIG. 7 above refers to the allocation of a new smaller pristine page (in block 106), in another example, this method may be combined with the ideas described above in relation to FIGS. 3-6 and a non-pristine page, where any actual or impending non-maskable failures correspond to failure-tolerant areas of virtual memory, may instead be allocated.

Figure 8:
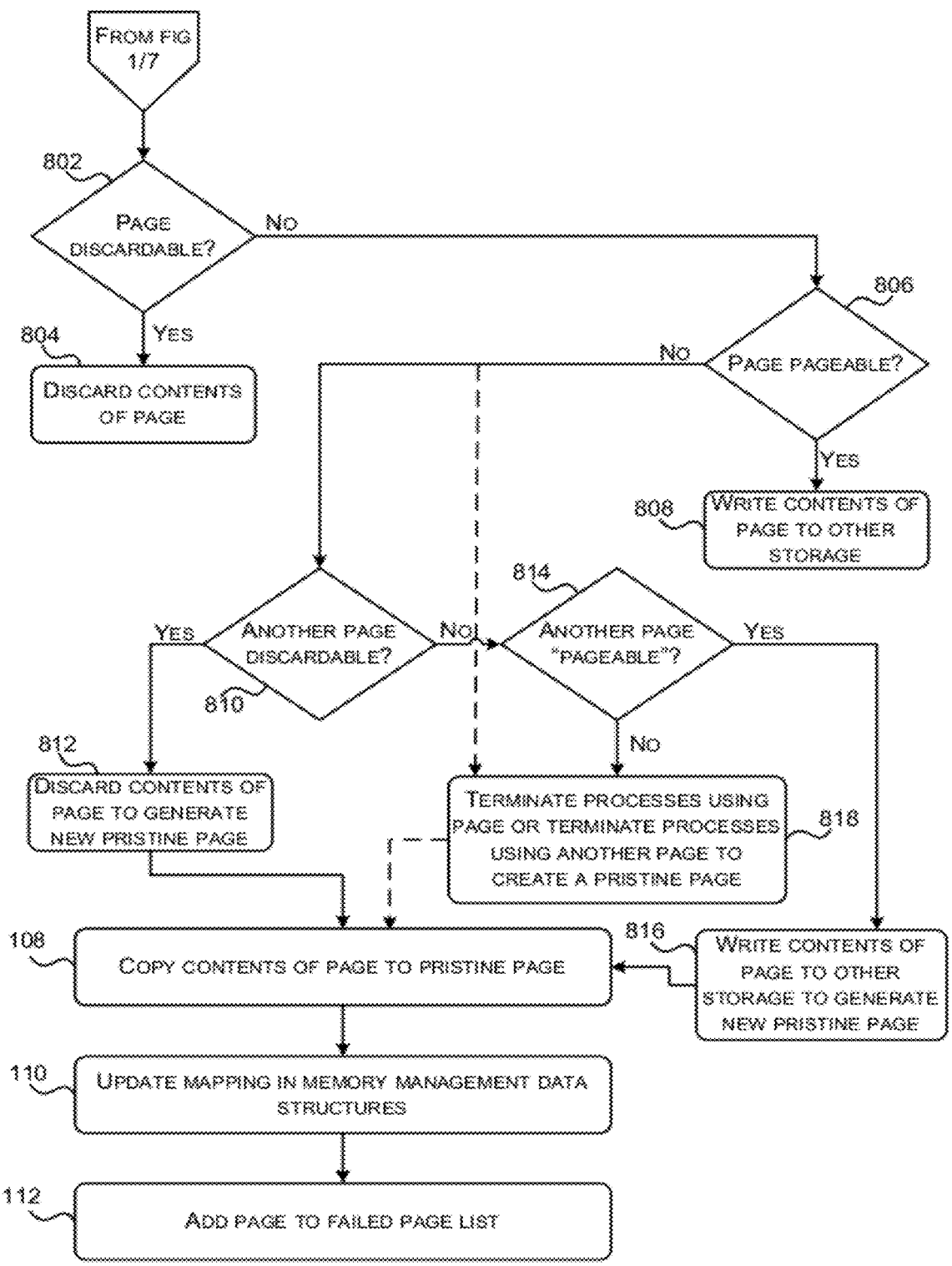

The method shown in FIG. 8 describes alternative strategies which may be adopted where there is no pristine page available (e.g. following from the methods shown in FIG. 1 and/or FIG. 7). The method has a number of decision points relating to whether a page is considered 'pageable' or 'discardable' and although the example flow diagram in FIG. 8 includes both these decisions regarding first the page in question (e.g. P100) and then an alternative page, it will be appreciated that in other example methods, only a subset of these decisions may be considered (e.g. only decisions relating to pageability or discardability, or only decisions relating to other pages and not the page in question etc). A page is considered 'pageable' if it can be written out to backing storage elsewhere (such as a page file) and then the contents can then be fetched subsequently if required using conventional demand-paging mechanisms. A page is considered 'discardable' if it holds data, such as a program's binary code, that is available elsewhere such that the contents of the page can be discarded and conventional demand-paging mechanisms used to fetch the contents again at a later stage (at which point free space may have become available).

As shown in FIG. 8, if the page containing the impending non-maskable failure (P100 in the earlier graphical examples) is discardable ('Yes' in block 802), the contents of the page are discarded (block 804). If the page is not discardable ('No' in block 802), but is pageable ('Yes' in block 806), then the contents of the page are written to other storage (block 808). If the page is neither discardable or pageable ('No' in both blocks 802 and 806), then other pages of physical memory are examined to determine if another page is discardable (in block 810), in which case the contents of that page are discarded (in block 812) to generate a new pristine page which can then be used to store the contents of the page containing the impending non-maskable failure, as described above with reference to FIG. 1 (blocks 108-112). If another page is not discardable ('No' in block 810) but there is another page which is pageable ('Yes' in block 814), then the contents of that other page are written to other storage (block 816) in order to generate a pristine page which can then be used to store the contents of the page containing the impending non-maskable failure (blocks 108-112). In an example implementation, a new pristine page may be found in blocks 810 and 814 using existing mechanisms in the operating system for finding a free physical page when a process requires more space.

If however, there are no other pages which are either pageable or discardable ('No' in both blocks 810 and 814), then one or more processes may be terminated (in block 818) in order to contain the failure to a set of processes rather than causing the whole system to fail. The set of processes may be those processes using the page containing the impending non-maskable failure (P100 in the examples given earlier) or may be those processes using another page, which will then be released thereby generating a pristine page which can be used to store the contents of the page containing the impending non-maskable failure (blocks 108-110, as indicated by the dotted arrow in FIG. 8). The set of processes may be identified using a 'reverse page table' structure where provided by the operating system. This structure maps physical pages to the virtual pages that map to them. If such a structure is not available, a search algorithm may be used to identify the processes involved by inspecting each process in turn. As failures occur rarely, such a search process will not be implemented often and as such will not result in much processing overhead. In a further variation, one or more processes may be terminated (in block 818), once it has been determined that the particular page is neither discardable or pageable ('No' in both blocks 802 and 806), as indicated by the dotted arrow in FIG. 8.

In a further extension of any of the methods described above, a computer system may incorporate both conventional failure-free DRAM and more failure-prone storage, such as PCM. In such a system, the properties of the totality of the memory may be exploited, for example through deciding which data should be stored in DRAM and which data should be stored in the more failure-prone memory, which for the purposes of the following discussion is referred to as PCM by way of example only. If an area of a process's virtual address space is likely to experience frequent writes then it is allocated in DRAM. This reduces wear on the PCM storage and/or provides better performance where writes are significantly faster to DRAM than PCM (or an alternative failure-prone storage).

In a first example, the youngest portion of a thread's stack may be allocated in DRAM (as it is likely to be accessed most frequently). If a thread's stack is extended then a DRAM page is allocated for the new region and this may involve reusing a DRAM page formerly used for the older end of the thread's stack after first transferring the data in the DRAM page to PCM storage and remapping the PCM storage to the same virtual address that was occupied by the DRAM. Conversely, if the stack contracts, storage may be migrated back from PCM to DRAM. Existing techniques may be used to trigger these conversions, such as additional code in function prologs/epilogs or guard pages can be used to trigger access violations beyond the extent of the virtual address space mapped to DRAM or existing return addresses on the stack can be modified so that execution passes to a stack management function when the stack contracts. In a second example, the youngest generation of the heap may be allocated in DRAM and older generations allocated in DRAM as these older generations are often read only or at least more stable.

In a further example, a 'reserve pool' of DRAM pages may be allocated (e.g. by the operating system) and used to provide pristine pages. Such pages are failure-free and so using DRAM reduces the likelihood of further impending non-maskable failure notifications being received while handling an existing impending failure notification. In addition, copying data to a DRAM page may be significantly faster than copying data to a PCM page. The reserve pool may subsequently be replenished by using one or more of the methods described above to move data back from a DRAM page to a PCM page, where the PCM page may be a pristine page or a PCM page with compatible failures.

In another example, pages or areas of pages which contain an impending non-maskable failure may be used to store read only objects. A fine grain matching algorithm (which may be similar to one described above) may be used to identify read only objects and to allocate them to regions which may be deemed near to failure (i.e. they contain a cell to which an impending non-maskable failure notification relates).

Figure 10:
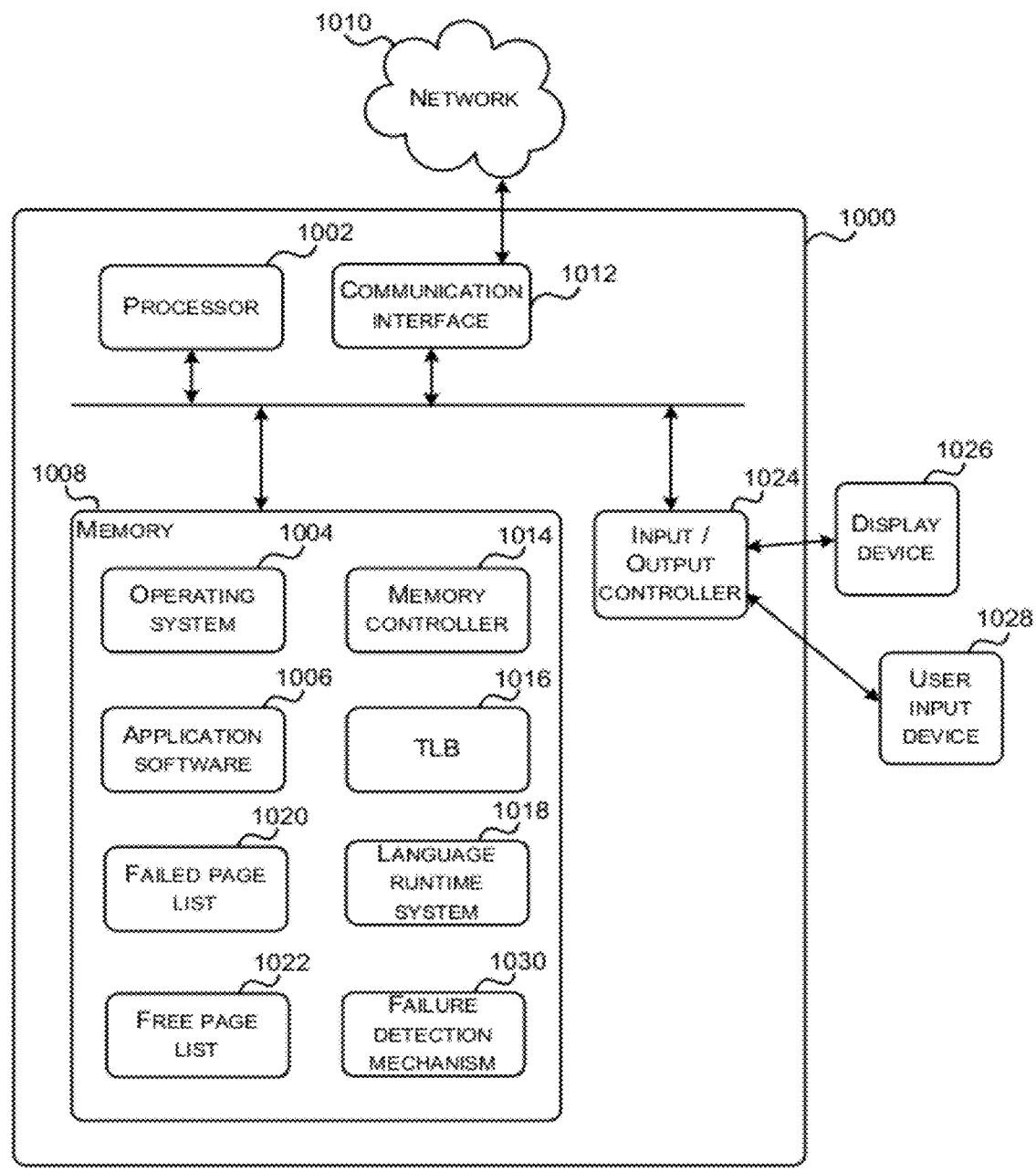
FIG. 10 illustrates an exemplary computing-based device in which embodiments of the memory management methods described may be implemented.

FIG. 10 illustrates various components of an exemplary computing-based device 1000 which may be implemented as any form of a computing and/or electronic device, and in which embodiments of the memory management methods described above may be implemented.

Computing-based device 1000 comprises one or more processors 1002 which may be microprocessors, controllers or any other suitable type of processors for processing computing executable instructions to control the operation of the device in order to allocate memory using any of the methods (or any combination of the methods) described above. In some examples, for example where a system on a chip architecture is used, the processors 1002 may include one or more fixed function blocks (also referred to as accelerators) which implement a part of any of the methods of memory management in hardware (rather than software or firmware). Platform software comprising an operating system 1004 or any other suitable platform software may be provided at the computing-based device to enable application software 1006 to be executed on the device.

The computer executable instructions may be provided using any computer-readable media that is accessible by computing based device 1000. Computer-readable media may include, for example, computer storage media such as memory 1008 and communications media. Computer storage media, such as memory 1008, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media.

The memory 1008 includes at least a portion of physical memory which is provided using a memory which is more failure-prone than DRAM (e.g. PCM, RRAM, STT-RAM, MRAM, FRAM or Racetrack memory) and may also comprise a portion of physical memory which is provided using DRAM. The memory 1008 may be used to store, in addition to the operating system 1004 and application software 1006, one or more of a memory controller 1014, a TLB 1016, a language runtime system 1018, a failed pages list 1020, a free page list 1022 (or other lists of pages as described above) and a failure detection mechanism 1030 (such as provided by ECP).

Although the computer storage media (memory 1008) is shown within the computing-based device 1000 it will be appreciated that the storage may be distributed or located remotely and accessed via a network 1010 or other communication link (e.g. using communication interface 1012).

The computing-based device 1000 may also comprise an input/output controller 1024 arranged to output display information to a display device 1026 which may be separate from or integral to the computing-based device 1000. The display information may provide a graphical user interface. The input/output controller 1024 may also be arranged to receive and process input from one or more devices, such as a user input device 1028 (e.g. a mouse or a keyboard). This user input may be used to provide inputs to the operating system 1004 and application software 1006. In an embodiment the display device 1026 may also act as the user input device 1028 if it is a touch sensitive display device. The input/output controller 1024 may also output data to devices other than the display device, e.g. a locally connected printing device (not shown in FIG. 10).

Although the present examples are described and illustrated herein as being implemented in a computing system as shown in FIG. 10, the system described is provided as an example and not a limitation. As those skilled in the art will appreciate, the present examples are suitable for application in a variety of different types of computing systems and the methods may be performed by the operating system, the language runtime system or another system and any suitable method of memory management may be used and the combination of a memory controller and TLB is shown by way of example only.

Figure 9:
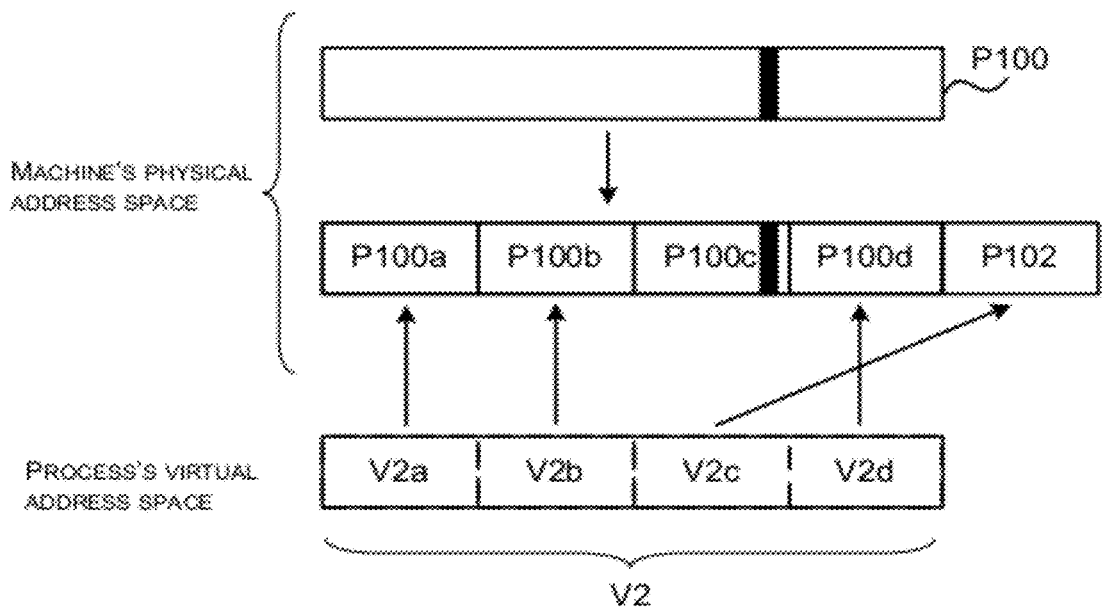
FIG. 9 is another schematic diagram showing remapping of virtual memory to physical memory.

The above description details many different methods which may be used independently of each other or in any combination, for example, the method shown graphically in FIG. 9 where a larger page is divided into smaller pages (e.g. a super page divided into multiple pages) may be combined with any of the other methods described, and in another example, instead of allocating a pristine page in any of the methods, a compatible non-pristine page (e.g. as shown graphically in FIG. 5) may alternatively be allocated.

Although as described above, the methods described herein may be most useful for unmanaged languages such as C and C++, the methods are also applicable to other languages and may be used with managed languages such as C# and F#. They may be used, for example, to handle data within the language runtime system of a managed language, or to handle objects that the managed language cannot relocate in its virtual address space because the objects have been "pinned" to fixed addresses.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of memory management implemented in a computing system comprising:
    receiving a notification of an impending non-maskable failure of a memory cell in a first page of physical memory;
    copying the contents of the first page of physical memory to a second page of physical memory and adding at least a part of the first page of physical memory to a list of pages containing failures;
    and wherein the method further comprises, upon allocation of a new page of virtual memory by a process:
    receiving an indication of whether the process will accept storage with failures; and if the process indicates that it will accept storage with failures, allocating a page of physical memory from the list of pages containing failures to the process and providing data to the process identifying locations of any impending non-maskable failures in the allocated page of physical memory.

2. A method according to claim 1, wherein the second page of physical memory comprises a pristine page of memory and wherein all of the first page of physical memory is added to a list of pages containing failures.

3. A method according to claim 1, wherein:
   a first page of virtual memory of a process is mapped to the first page of physical memory,
   the second page of physical memory comprises at least one impending non-maskable failure, and
   the method further comprises selecting the second page of physical memory from a plurality of alternative pages, at least one of the alternative pages comprising at least one impending non-maskable failure by:
   obtaining data identifying failure-tolerant regions of the first page of virtual memory;
   obtaining information about locations of any impending non-maskable failures in each of the plurality of alternative pages;
   performing matching of failure-tolerant regions of the first page of virtual memory and locations of any impending non-maskable failures in each of the plurality of alternative pages of physical memory to identify a compatible alternative page where the location of any impending non-maskable failures are aligned with failure-tolerant regions;
   copying data from the first page of physical memory to the compatible alternative page; and
   updating memory mappings stored in the computing system to map the first page of virtual memory to the compatible alternative page of physical memory instead of to the first page of physical memory.

4. A method according to claim 1, wherein:
   a first page of virtual memory of a process is mapped to the first page of physical memory,
   the computing system supports multiple page sizes, and
   the first page of physical memory is of a first size which is larger than a second size supported by the computer system,
   wherein copying the contents of the first page of physical memory to the second page of physical memory and adding at least a part of the first page of physical memory to a list of pages containing failures comprises:
   dividing the first page of physical memory into a plurality of pages of the second size, one of the plurality of pages of the second size comprising the impending non-maskable failure;
   allocating the second page of physical memory, the second page being of the second size;
   copying data from the one of the plurality of pages of the second size comprising the impending non-maskable failure to the allocated second page;
   updating memory mappings stored in the computer system to map a portion of the first page of virtual memory of a process to the allocated second page; and
   adding the one of the plurality of pages of the second size comprising the impending non-maskable failure to a list of pages containing failures.

5. A method according to claim 4, wherein the second page of physical memory comprises a pristine page of memory.

6. A method according to claim 1, wherein the second page of physical memory is generated by:
   identifying a page in physical memory containing data which is discardable; and
   discarding the data in the identified page to generate a pristine second page of physical memory.

7. A method according to claim 1, wherein the second page of physical memory is generated by:
   identifying a page in physical memory containing data which is pageable; and
   writing the data in the identified page to alternative storage to generate a pristine second page of physical memory.

8. A method according to claim 1, wherein the computing system comprises a phase-change memory device and the first page of physical memory is stored in the phase-change memory device.

9. A method according to claim 8, wherein the computing system comprises a DRAM device and the second page of physical memory is stored in the DRAM device.

10. A method of memory management implemented in a computing system comprising:
    obtaining information from processes about failure-tolerant parts of a virtual page mapped to a first page of physical memory;
    obtaining information about locations of impending non-maskable failures in a plurality of pages of physical memory;
    performing matching of failure-tolerant parts of a virtual page and locations of any impending non-maskable failures in each of the plurality of pages of physical memory to identify any compatible pages of physical memory where the locations of impending non-maskable failures are aligned with failure-tolerant parts;
    copying data from the first page of physical memory to an identified compatible page of physical memory comprising at least one impending non-maskable failure; and
    updating memory mappings stored in the computing system to map the virtual page to the identified compatible page of physical memory.

11. A method according to claim 10, wherein the method is performed on receipt of a notification of an impending non-maskable failure within the first page of physical memory and the method further comprises:
    obtaining information on a location of the impending non-maskable failure within the first page of physical memory;
    determining if the location of the impending non-maskable failure within the first page of physical memory is aligned to a failure-tolerant part of the virtual page; and
    only performing the copying and updating steps if the location of the impending non-maskable failure is not aligned to a failure-tolerant part of the virtual page.

12. A method according to claim 10, wherein the method further comprises:
    receiving a notification of an impending non-maskable failure of a memory cell in a first page of physical memory;
    if a pristine page of physical memory is available, copying the contents of the first page of physical memory to the pristine page of physical memory and adding at least a part of the first page of physical memory to a list of pages containing failures; and
    if a pristine page is not available, performing the steps of obtaining information about failure-tolerant parts and about locations of impending non-maskable failures, performing matching to identify a compatible page and copying data to the compatible page.

13. A method according to claim 10, wherein the method is performed periodically to reduce a number of impending non-maskable failures in unused pages of physical memory.

14. A method according to claim 10, further comprising, upon allocation of a new page of virtual memory by a process:
receiving an indication of whether the process will accept storage with failures; and
if the process indicates that it will accept storage with failures, allocating a page of physical memory comprising at least one impending non-maskable failure to the process and providing data to the process identifying a location of the at least one impending non-maskable failure in the allocated page of physical memory.

15. A method according to claim 10, wherein the computing system comprises an operating system and the method is performed by the operating system.

16. A method according to claim 10, wherein the computing system comprises a language runtime system and the method is performed by the language runtime system.

17. A computing system comprising:
a processor;
a memory comprising at least one non-volatile memory element with a failure detection mechanism and a memory controller, wherein the memory is arranged to store executable instructions which, when executed, cause the processor to:
receive notification of an impending non-maskable failure of a memory cell in a first page of physical memory using the failure detection mechanism, wherein the memory controller is arranged to map a page of virtual memory of the process to the first page of physical memory;
if a pristine page of physical memory is available, to copy contents of the first page to the pristine page, to update the memory controller to map the page of virtual memory of the process to the pristine page, and to add at least a part of the first page to a failed page list; and
if a pristine page of physical memory is not available, to obtain information from the process identifying any failure-tolerant portions of the page of virtual memory, to select a non-pristine page of physical memory which comprises failures only in locations corresponding to the identified failure-tolerant portions of the page of virtual memory, to copy the contents of the first page to the non-pristine page and to update the memory controller to map the page of virtual memory of the process to the non-pristine page.

18. A computing system according to claim 17, wherein the memory is further arranged to store executable instructions which, when executed, cause the processor to:
receive an indication from a process identifying whether it can accept physical memory comprising failures upon allocation of a new page of virtual address space by the process; and
if the indication identifies that the process can accept physical memory comprising failures, allocating a page of physical memory selected from the failed page list to the process and providing the process with access to data identifying locations of any impending non-maskable failures in the allocated page.

19. A computing system according to claim 17, wherein:
the memory controller supports a first and a second size of pages of physical memory,
the first page of physical memory is of the first size and the pristine page is of the second size, the first size being larger than the second size, and
copying contents of the first page to the pristine page comprises: dividing the first page into a plurality of pages of the second size, one of the plurality of pages comprising the impending non-maskable failure, and copying contents of the one of the plurality of pages of the second size comprises the impending non-maskable failure to the pristine page.

20. A computing system according to claim 17, wherein the failure detection mechanism uses Error Correcting Pointers.

\* \* \* \* \*